UNITED STATES PATENT OFFICE.

FRANKLIN F. BRADLEY, OF CHICAGO, ILLINOIS, ASSIGNOR TO BRADLEY & VROOMAN CO., OF CHICAGO, ILLINOIS, A FIRM.

ART OF MAKING PAINTS.

1,077,239.	Specification of Letters Patent.	Patented Oct. 28, 1913.

No Drawing.	Application filed February 26, 1913. Serial No. 750,809.

*To all whom it may concern:*

Be it known that I, FRANKLIN F. BRADLEY, a citizen of the United States, residing at Chicago, in the county of Cook and State of Illinois, have invented certain new and useful Improvements in the Art of Making Paints, of which the following is a specification.

This invention relates to improvements in the art of making paints, and has for its object the provision of a method of producing liquid paints, which method possesses many desirable characteristics, among which may be noted the economy with which liquid paints may be made and handled commercially, the long preservation of the liquid paint constituents in their original and unimpaired condition, and the predetermined accurate results as to color, etc., resulting from an intermingling of such constituents. Heretofore, in this art, it has been the practice and this practice is still common to form the constituents of liquid paints in bulk within large vats or tanks, and then (following what might be termed quite an experimental practice) assemble the approximate proportions of such constituents, still in large quantities or bulk, mix them together, test and retest, and, by adding more of required ingredients, finally produce liquid paints of desired colors and characteristics which are then packed for the trade.

Making liquid paints by the uninterrupted method referred to is objectionable in many instances in view of the fact that it contemplates storing the completed product in cans which may not be required by the demands of trade for many months and even years, under which conditions at least a portion of the completed product materially deteriorates by reason of the reaction of the paint constituents upon each other.

In my Patent No. 1,032,652, issued July 16, 1912, I have set forth a method of compounding mixed paints consisting in producing separate masses of different paint bases of definite character capable of producing, when tinted, a substantially complete line of mixed liquid paints, producing separate masses of different tinting substances of definite character in number relatively greater than the separate masses of different paint bases to accord with the shades of said complete line, each being complemental in character to at least one of the paint bases, dividing the base masses into minor base bodies of definite volume, dividing the tinting masses into minor tinting bodies of definite volume, normally storing and preserving in independent containers the individual minor base bodies, appropriately designating and indicating the inter-relation and the expected use with each other of the minor tinting and minor base bodies, and subsequently bringing together the desired minor tinting bodies with their complemental minor base bodies so that the resultant product in each instance will constitute a definite quantity of paint material insuring by their mixture paint of desired definite color.

In the method of my aforesaid patent the paint bases are prepared at the factory and are shipped to their varying destinations in containers of sufficiently small size to adapt them to the business of retail store-keepers. The paint bases, in the method of my said patent, contain the proper proportion of pigment and liquids to render them capable of immediate use upon the addition of suitable tinters which do not materially modify the fluidity and other qualities that are requisite in paints ready for use. The paint materials employed in the practice of my earlier method and in liquid paints as supplied to the trade prior to my earlier method, include liquid ingredients of material weight and material quantity, which not only required no skill in their intermixture with the other ingredients but which being standard commercial products capable of being purchased in every section of the country increased the cost to the dealer or jobber owing to shipment charges from the manufacturer to the jobber, a material portion of which shipment charges could be saved were such liquid ingredients omitted from among the paint constituents until they reached the jobber. A part of the jobber's capital is also tied up in the thinning agents combined with the pigments, thereby adding to the cost to the dealer and consumer. Also the manufacturer's profit is chargeable in part, to such liquid ingredients and this portion of the manufacturer's profit has increased the cost paid by the dealer. Then again such liquid ingredients which do not require expert skill in order that they be properly introduced into paint, serve to thin the product to such an extent that it is liable to leak in transit, the loss, when it occurs, varying from a negligible to the total quantity. Under these conditions as indicated above, the percentage of loss by spoiling is greater than in my present method.

My present process is distinguished by several features set forth in detail below which includes among others, first, the preparation of a series of paint stocks in a condition which I have termed "thickly flowing," and second, the use of a large proportion of inert thinner in such preparation. One object, among others, of these features, is the preparation and maintenance of such stocks under conditions which minimize the tendency of the ingredients to react with each other.

The thickly flowing condition previously alluded to, is very important in the effective execution of my process. As is well known, certain substances, such as the lead oxids when used as pigments, in connection with paint vehicles of the ordinary type, linseed oil for instance, have a tendency to thicken the oil. This goes on slowly, particularly in closed receptacles, at winter temperature, but faster in summer. Its effects are not noticeable for the first few months after the paint has been mixed, but paint which has been made for a year or two and left to stand in a warm place, sometimes is quite unusable. One reason why this injurious reaction goes on faster in warm places is that the paint vehicle when warm, is thinner, and reactions of course take place with greater rapidity in thinner media. By having my paint thickly flowing, a viscous, colloidal condition seems to be attained which retards to a noticeable extent the objections pointed out above. This condition I attribute in part to the colloidal condition which many solids assume when thoroughly and intimately mixed in fine condition with a suitable menstruum. Clay when properly mixed with water, is an example. Furthermore, the pigments themselves sometimes seem to aggregate into nuclei when they are allowed to stand too long in paint completely mixed, and the paint becomes, as it were, granular, loses its smooth flowing condition, and to a great extent its covering power, and sometimes the color changes. Pigments settle to the bottom of containers also, and form a more or less hard cake which has to be broken up by a stirrer, or the paint has to be thrown away or sent back to the manufacturer to be reground, and grinding paints is an expensive operation.

As indicated above, another feature of my present process is the use in the preparation of my paint stocks to the thickly flowing consistency, of little oil and proportionately much thinner. For the thinner I select suitable liquids which are chemically inert. These are cheaper than oil, go further toward effecting the slowly flowing condition than an equal quantity of any of the oils or varnishes usually employed, and, as indicated above, have no effect on the pigments.

Every properly compounded liquid paint for all ordinary purposes, contains a percentage of spirit, by which is meant benzin, turpentine, or some similar liquid. In producing liquid paint by the interrupted process under consideration, I use in the grinding, as large a proportion as possible, of the spirit portion of the liquid that is to go into the completed liquid paint, because the spirits are more chemically inert than the oils or varnishes which constitute the remainder of the vehicle to be employed.

It is not usually feasible to use more than a portion of the spirit and it is not feasible to grind the pigment only in spirit. There must be some oil or some varnish, but by keeping the percentage of varnish and oil down, and increasing the percentage of spirit, that portion of the paint which must stay for the longest time in containers, namely, the "slowly-flowing" stocks, will be less affected by chemical change than where only oil or only varnish or only a mixture of oil and varnish is to be used for the grinding liquid.

The linoleic acid in linseed oil, as well as other fatty acids have a strong tendency to combine with the lead and zinc oxids usually present, to make lead and zinc linoleates or similar metallic soaps. This tendency I overcome to a large extent, in the manner I have indicated above, namely, by using a large percentage of spirit.

I have advanced certain theories in the foregoing which I have not been able to verify *in toto*, and they may not be correct, hence I do not wish to be bound by them. As a manufacturer of paints, however, I know that practical difficulties of the nature indicated arise when fully mixed paints are allowed to stand too long, and I also know that by preparing my paints in an incompletely (incomplete as to the quantity and kind of vehicle) mixed condition, many of these objections are diminished or obviated altogether. I attribute this in part, to the thickly flowing condition in which they are primarily mixed and shipped and for a time maintained, and also to the fact that in the hands of the jobber, these paints undergo a final thorough mixing whereby the particles of heavy pigment are again thoroughly mixed and distributed through the proper menstrua, and are then at once put into the smaller receptacles in which paint is usually sold, and are passed on promptly (for the jobber usually only mixes for orders received and makes little attempt to keep on hand any stock completely mixed), and are used before any noticeably bad effects can occur. In the smaller containers which the trade demands, moreover, there is always less caking or settling since necessarily the tendency to separate or stratify is less accentuated.

It is obvious that the paint stocks must have enough liquid with them to enable them to mix easily and the liquid should be the same for each stock of the series, or if not the same, each should be of such a kind as to be easily miscible with any of or with all of the others.

My paint stocks may be regarded as a series of pigments ground and thoroughly wetted with suitable oils and other vehicles, but too thick to be usable with a brush. Dry pigments can only be mixed well by the use of proper machinery. The paint stocks which I prepare are easily miscible with each other by simply stirring and also with the proper vehicles.

I intend my process primarily for oil paints, though, of course, it applies to others.

In practising my present invention I produce the necessary number of paint stocks which is required to make substantially complete lines of all ordinary liquid paints. These stocks are standardized so that they bear a fixed complemental relationship to each other enabling them to be conjointly used in unchanging proportions, where such conjoint use is necessary, to produce desired predetermined liquid paints. There is employed in such stocks sufficient liquid to enable the stock slowly to flow by action of gravity. The process of making the liquid paints is interrupted until the stocks have been received by the jobber who completes the process of manufacture by adding additional necessary liquid material to one or a combination of two or more of the paint stocks, all in accordance with complete instructions and formulæ furnished him by the manufacturer of the stocks. When the jobber in this manner produces liquid paints he does so without experimentation, all experimental stages of operation having occurred at the factory where the stocks and the formulæ were produced and where definite results were assured and positively predetermined without the exercise of skill or experimentation by the jobber.

In the preferred embodiment of my invention I produce eleven paint stocks which are usable in connection with six different liquids obtainable from any market the purchaser may choose, for producing a line of liquid paints sufficiently complete ordinarily to satisfy the trade, these different paint stocks including only sufficient liquid for the purpose above stated. These stocks are constituted as follows:

*Stock white.*

35 per cent. zinc oxid
20 per cent. lead carbonate
15 per cent. lead sulfate
15 per cent. linseed oil
10 per cent. naphtha
5 per cent. Japan drier 100 per cent.

*Stock red.*

15 per cent. ferric oxid
55 per cent. magnesium silicate
15 per cent. linseed oil
10 per cent. naphtha
5 per cent. Japan drier 100 per cent.

*Stock green.*

5 per cent. lead sulfate
10 per cent. lead chromate
5 per cent. lead carbonate
5 per cent. ferri-ferro cyanid
45 per cent. calcium carbonate
15 per cent. linseed oil
10 per cent. naphtha
5 per cent. Japan drier 100 per cent.

*Stock black.*

10 per cent. carbon
20 per cent. calcium carbonate
40 per cent. barium sulfate
15 per cent. linseed oil
10 per cent. naphtha
5 per cent. Japan drier 100 per cent.

*Stock ocher.*

15 per cent. ferric oxid
55 per cent. silica
15 per cent. linseed oil
10 per cent. naphtha
5 per cent. Japan drier 100 per cent.

*Stock yellow.*

5 per cent. lead carbonate
15 per cent. lead sulfate
25 per cent. lead chromate
25 per cent. barium sulfate
15 per cent. linseed oil
10 per cent. naphtha
5 per cent. Japan drier 100 per cent.

Stock blue.

35 per cent. ultramarine blue
35 per cent. calcium carbonate
15 per cent. linseed oil
10 per cent. naphtha
5 per cent. Japan drier 100 per cent.

Stock bright red.

10 per cent. organic coloring matter
60 per cent. calcium carbonate
15 per cent. linseed oil
10 per cent. naphtha
5 per cent. Japan drier 100 per cent.

Stock mahogany.

10 per cent. organic coloring matter
30 per cent. calcium carbonate
30 per cent. barium sulfate
10 per cent. naphtha
20 per cent. varnish 100 per cent.

Stock enamel white.

50 per cent. zinc oxid
20 per cent. calcium carbonate
15 per cent. varnish
15 per cent. naphtha 100 per cent.

Stock extender.

(For extending and cheapening other paints).

60 per cent. magnesium silicate
20 per cent. varnish
20 per cent. naphtha 100 per cent.

These formulæ are good, but not imperative. The quantity of linseed oil may sometimes be reduced. The reduction would have to be carefully calculated in the eleven stocks, and corresponding change in the jobbers' prescriptions made.

An outfit shipped to a jobber by a manufacturer of paint stocks and suitable for an ordinary line of liquid paints includes six barrels of stocks, each of approximately fifty gallons and individually containing stock white, stock red, stock green, stock black, stock ocher and stock extender and five kegs each of approximately twenty gallons and individually containing stock yellow, stock blue, stock bright red, stock mahogany and stock enamel white. The barrels and kegs are what are termed agitator packages, each containing agitator mechanism to be employed by the jobber thoroughly to intermix the ingredients of the paint stocks before any portion of any of the stocks is removed before completing the interrupted manufacture of the liquid paints. Such an agitator package suitable for the present purpose and containing hand operated agitator mechanism is disclosed in patents to Stern, No. 857,683, June 25, 1907; Stockman, No. 972,727, October 11, 1910, and Mitchell, No. 955,978, April 26, 1910. The jobber supplies faucets to the kegs and barrels near their bottoms.

To enable the jobber to complete the interrupted manufacture of the liquid paints begun by the manufacturer of the paint stocks the jobber is required to add additional necessary liquid material in accordance with the instructions and formulæ furnished him by the manufacturer of the stocks. These instructions call for the use of the following liquids: raw linseed oil, turpentine, naphtha, durable mixing varnish, white enamel varnish, asphaltum varnish. These six liquids may be combined with the various paint stocks, either singly or in combination so as to produce a large variety of liquid paints, the jobber being usually furnished with 122 formulæ for producing as many liquid paints; the proportions given in the formulæ being by bulk. This number of liquid paints will be sufficient for all the ordinary commercial shades of what is commonly known as mixed paint (by which is meant liquid oil paints largely used for the exterior painting of buildings, such as houses); floor paints (for use on interior floors); porch and step paints (for use on exterior floors); enamels (for interior woodwork, iron beds, etc); varnish stains (for coating of interior woodwork or any painted surface to give it the appearance of varnished expensive wood); barn paint which is similar to mixed paint, as described above, except that it is of cheaper quality); buggy paint (which is durable, high-gloss paint); wagon and implement paint (which is similar to buggy paint but of a cheaper quality); screen paint (which is a colored enamel of very thin consistency so that it will not clog the mesh of a wire screen when applied on it).

Examples of the 122 formulæ are as follows:

*Milwaukee brick mixed paint.*—5 gals. of stock white, 1 gal. of stock ocher, 4 gal. of raw linseed oil.

*Pea green enamel.*—1 gal. of stock enamel white, 1 gal. of stock green, 2 gals. of white enamel varnish.

*Dark gray mixed paint.*—5 gals. of stock white, 1 gal. of stock black, 4 gals. of raw linseed oil.

To make dark gray barn paint add to ten gallons dark gray mixed paint the following: 4 gals. of stock extender, 4 gals. of raw linseed oil, 2 gals. of naphtha.

In practising the method of my invention the requisite paint stock or stocks are thoroughly agitated in their respective agitator barrels or kegs, as the case may be, by the jobber. The stock or stocks are then withdrawn from their packages in the predetermined quantities described by the formulæ and are intermixed with the predetermined quantities described by the formulæ of complemental liquid or liquids. The result is a definite quantity and quality of desired definite liquid paint having definite color and composition all as predetermined at the factory where the paint stocks are made and as assured by following the prescribed formulæ, each of which is for a distinct liquid paint. The jobber is not called upon to exercise any skill, as the skill required in producing the liquid paint has been exercised in producing the paint stocks, the liquids complemental to the paint stocks being standardized commercial commodities, readily obtainable upon the market. From the foregoing examples which have been furnished it will be seen that the liquids complemental to the paint stocks constitute large percentages of the liquid paints, whose manufacture is completed by the jobber, the absence of these complemental liquids in the material furnished by the manufacturer to the jobber giving rise to many advantages.

In practice of my invention all experimental stages of operation have been passed in the production of the paint stocks, predetermined accurate results and paints of predetermined characteristics assuredly following the commingling of paint stocks and their complemental liquids effected by the jobbers pursuant to the definite formulæ furnished the jobbers by the manufacturers of the paint stocks. That is, the resultant product in such case will constitute a definite quantity of paint materials assuring by their mixture, paint of desired definite color and composition, the total desired resultant products in all cases including definite quantities of paint material insuring complete lines of liquid paints of desired definite colors and composition for all ordinary commercial purposes.

By means of the method herein disclosed the manufacture of a stock of finished and canned liquid paints may be completed by the jobber and the liquid paints supplied by him to the dealer who furnishes the consumer. The liquid paints thus supplied to the dealer by the jobber may always be fresh when thus supplied since the jobber need not complete the manufacture of the liquid paints until the order therefor is received, it being understood that the jobber is supplied with cans of the usual commercial sizes, gallons, half gallons, quarts, pints and half pints. The jobber may use the cans as the containers into which the ingredients are placed in quantities proportionate to the final product in which event gages suited to the cans of different sizes are employed. In the event of larger quantities of the final product being required the jobber may employ mixing containers into which measured quantities of the ingredients are poured and after the mixing has occurred the final product is distributed among the cans which may bear labels which will name the product and, if desired, the ingredients thereof. The jobber thus becomes a liquid paint manufacturer who secures the desired results without himself employing skill such as used by liquid paint manufacturers prior to my invention to secure equally good results. It is obvious that the space required by the jobber as a consequence of my invention is much less than that which was previously required to hold the completed paints received by the jobber from the manufacturer.

My invention is adapted best to serve different sections of the country, some having a very dry atmosphere, others very moist, others being mining and smelting districts where gases are produced, etc., and again liquid paints of certain characteristics are best adapted to woods prevalent in certain sections. By means of my invention the original manufacturer is not required to supply the jobbers with the liquid paints which will meet the varying conditions in the different sections of the country but is only required to supply the jobbers with the requisite paint stocks and the formulæ for producing the suitable liquid paints.

In addition to the advantages which have been pointed out, the jobbers will save much in the way of investment as they are obliged to carry only the paint stocks and possibly the varnish, the balance of the ingredients being obtained as required. The jobbers are, by means of my invention, able to supply their trade with any of the one hundred twenty-two different liquid paints by an investment of from five per cent. to ten per cent. of the investment required to supply such liquid paint in accordance with prior practice.

The method of my aforesaid patent is of particular service for enabling the dealer to supply ready mixed paints directly to the consumer. The system of my present invention is of particular service to enable the jobbers to supply liquid paints to the dealers, though obviously the two inventions are not to be thus restricted.

My method is a method which consists in producing a series of separate standardized paint stocks, (a) it may be, in a thickly flowing viscid condition, (1) by mixing or wetting or grinding, (b) it may be, with oil to which oil (c) it may be, is added a thinner, (d) it may be, inert toward the pigments and it may be, (e) as inert as possible, (f) it may be, in large proportion, (g) it may be, in as large a proportion as possible, (2) a series of suitable pigments, (h) it may be, storing said stocks each separately, then (3) according to formulæ (i) it may be, predetermined, (j) it may be, for color effects, (4) withdrawing and mixing (k) it may be, predetermined definite quantities of such, mixing and (5) thinning with (l) it may be, a suitable thinner.

It will thus be seen that I have in my process the five constants 1, 2, 3, 4, 5, and my elemental steps are (1) mixing or grinding, (2) suitable pigments and (3) according to formulæ, (4) withdrawing and mixing definite quantities of such stocks and (5) thinning. These things have to be. I call this series of constant factors, A. I have also certain variants.

Having thus described my invention, I claim as new and desire to secure by Letters Patent the following:

1. In the compounding of a line of liquid paints, the method consisting in producing paint stocks each standardized in strength and color, and of consistency materially greater than that of the liquid paints to be produced and which paint stocks bear a substantially fixed complemental relationship to each other, enabling them to be conjointly used in unchanging proportions in the production of liquid paints of predetermined character; placing these stocks in different containers; agitating said stocks to render them uniform throughout their masses; and adding together predetermined quantities of predetermined paint stocks, and predetermined quantities of predetermined paint liquid, to meet the requirements of the liquid paints to be produced.

2. The method which consists in producing a series of separate standardized paint stocks in a thickly flowing or viscid condition, selecting and mixing according to determined formulæ, quantities of said paint stocks to produce a desired color base and thinning by a suitable paint vehicle.

3. The method which consists in producing a series of separate standardized paint stocks to a thickly flowing viscid condition and storing them each separately, then, according to formulæ predetermined for color effects, withdrawing predetermined definite quantities of such stocks selecting and mixing, and thinning with a suitable vehicle.

4. The method which consists in mixing or wetting each with oil and a thinner inert toward the pigment, to an extent which renders them readily miscible with paint vehicles, a series of pigmentary bases, to make a standardized series of paint stocks, effecting mixture predetermined according to formulæ, of such stocks, and effecting usable consistency by the addition of suitable paint vehicle.

5. The method which consists in producing a series of separate standardized paint stocks by grinding a series of suitable pigments in menstrua having a large proportion of suitable inert liquid therein, mixing according to predetermined formulæ, quantities of said paint stocks, to produce a desired color base, and thinning substantially as described.

6. The method which consists in producing a series of separate standardized paint stocks by grinding a series of suitable pigments in menstrua having as large a proportion as practicable of suitable liquid inert toward said pigments therein, mixing according to predetermined formulæ, quantities of said paint stocks to produce a desired color base and thinning substantially as described.

7. The method which consists in producing a series of separate standardized paint stocks by grinding a series of suitable pigmentary substances in menstrua having a large proportion of liquid inert toward the pigment, to a thickly flowing or viscous consistency, mixing according to predetermined formulæ, quantities of said paint stocks to produce a desired color base and thinning substantially as described.

8. The method which consists in producing a series of separate standardized paint stocks by grinding a series of suitable pigmentary substances in menstrua having as large a proportion as possible of liquid inert toward the pigment, to a thickly flowing or viscous consistency, mixing according to predetermined formulæ, quantities of said paint stocks to produce a desired color base and thinning substantially as described.

9. The method which consists in producing a series of separate standardized paint stocks by grinding a series of suitable pigmentary substances in menstrua having a large proportion of liquid inert toward the pigment, to a thickly flowing or viscous consistency, mixing according to predetermined formulæ, quantities of said paint stocks to produce a desired color base and thinning substantially as described.

10. The method which consists in producing a series of separate standardized paint stocks by grinding a series of suitable pigmentary substances in menstrua having as large a proportion as possible of liquid inert toward the pigment, to a thickly flowing or viscous consistency, mixing according to predetermined formulæ, quantities of said paint stocks to produce a desired color base and thinning substantially as described.

11. The method which consists in producing a series of separate standardized paint stocks by grinding to a thickly flowing viscid condition, a series of suitable pigmentary substances in menstrua having a proportion of liquid inert toward the pigment, mixing according to predetermined formulæ, quantities of said paint stocks to produce a desired color base, and thinning substantially as described.

12. The method which consists in producing a series of separate standardized paint stocks by grinding a series of suitable pigments in menstrua having a large proportion of suitable inert liquid, storing them each separately, then, according to formulæ predetermined for color effects, withdrawing predetermined definite quantities of such stocks, mixing, and thinning with a suitable vehicle.

13. The method which consists in producing a series of separate standardized paint stocks by grinding a series of suitable pigments in menstrua having as large a proportion as possible of suitable inert liquid, storing them each separately, then, according to formulæ predetermined for color effects, withdrawing predetermined quantities of such stocks, mixing and thinning with a suitable vehicle.

14. The method which consists in producing a series of separate standardized paint stocks by grinding to a thickly flowing viscid condition a series of suitable pigments in menstrua having a proportion of suitable inert liquid, storing them each separately, then, according to formulæ predetermined for color effects, withdrawing predetermined definite quantities of such stocks, mixing and thinning with a suitable vehicle.

15. The method which consists in producing a series of separate standardized paint stocks by grinding to a thickly flowing viscid condition, a series of suitable pigments in menstrua having a large proportion of suitable inert liquid, storing them each separately, then, according to formulæ predetermined for color effects, withdrawing predetermined definite quantities of such stocks, mixing and thinning with a suitable vehicle.

16. The method which consists in producing a series of separate standardized paint stocks by grinding to a thickly-flowing viscid condition, a series of suitable pigments in menstrua having as large a proportion as possible of suitable inert liquid, storing them each separately, then, according to formulæ predetermined for color effects, withdrawing predetermined quantities of such stocks, mixing, and thinning with a suitable vehicle.

17. The method which consists in mixing or wetting, each with oil and a large proportion of suitable thinner inert toward the pigment, to an extent which renders them readily miscible with paint vehicles, a series of pigmentary bases, to make a standardized series of paint stocks, effecting a mixture predetermined according to formulæ, of such stocks, and thinning to usable consistency by addition of suitable paint vehicle.

In testimony whereof I affix my signature in presence of two witnesses.

FRANKLIN F. BRADLEY.

Witnesses:
E. M. ROSENTHAL,
HENRY G. HORLOCK.